(12) United States Patent
Suau

(10) Patent No.: US 9,359,463 B2
(45) Date of Patent: *Jun. 7, 2016

(54) AMPHIPHILIC AND NON-WATER SOLUBLE (METH)ACRYLIC COMB POLYMERS

(75) Inventor: Jean-Marc Suau, Lucenay (FR)

(73) Assignee: COATEX, Genay (FR)

( * ) Notice: Subject to any disclaimer, the term of this patent is extended or adjusted under 35 U.S.C. 154(b) by 575 days.

This patent is subject to a terminal disclaimer.

(21) Appl. No.: 13/204,758

(22) Filed: Aug. 8, 2011

(65) Prior Publication Data

US 2012/0046412 A1   Feb. 23, 2012

Related U.S. Application Data

(60) Provisional application No. 61/376,350, filed on Aug. 24, 2010.

(30) Foreign Application Priority Data

Aug. 19, 2010 (FR) ..................... 10 56658

(51) Int. Cl.
| | |
|---|---|
| C08K 3/26 | (2006.01) |
| C08F 290/06 | (2006.01) |
| C09D 155/00 | (2006.01) |
| D21H 19/56 | (2006.01) |
| D21H 19/58 | (2006.01) |
| C08F 220/18 | (2006.01) |
| C08F 220/28 | (2006.01) |
| D21H 19/62 | (2006.01) |
| C08F 220/06 | (2006.01) |
| C08F 222/10 | (2006.01) |

(52) U.S. Cl.
CPC ........... *C08F 290/062* (2013.01); *C08F 220/18* (2013.01); *C08F 220/28* (2013.01); *C09D 155/005* (2013.01); *D21H 19/56* (2013.01); *D21H 19/58* (2013.01); *C08F 220/06* (2013.01); *C08F 222/1006* (2013.01); *C08F 2220/288* (2013.01); *D21H 19/62* (2013.01)
USPC ............... 524/425; 524/52; 524/53; 524/832; 524/833; 524/522; 524/426; 524/427; 524/447; 524/451; 526/318.2; 526/318.4; 526/318.41; 526/318.42

(58) Field of Classification Search
CPC ... C08F 290/062; C08F 220/18; C08F 220/06
USPC ................. 526/318.2, 318.4, 318.41, 318.42; 524/52, 53, 522, 425, 426, 427, 447, 524/451, 832, 833
See application file for complete search history.

(56) References Cited

U.S. PATENT DOCUMENTS

| | | | |
|---|---|---|---|
| 6,530,950 B1 | 3/2003 | Alvarado et al. | |
| 2003/0149470 A1* | 8/2003 | Alvarado et al. | ............ 623/1.13 |
| 2009/0170982 A1 | 7/2009 | Dupont et al. | |

FOREIGN PATENT DOCUMENTS

| | | |
|---|---|---|
| EP | 1 160 265 A1 | 12/2001 |
| JP | 60-170673 | 9/1985 |
| JP | 2-292350 | 12/1990 |
| JP | 4-285678 | 10/1992 |
| JP | 7-10943 | 1/1995 |
| JP | 2001139849 | 5/2001 |
| JP | 4138219 | 6/2008 |
| WO | WO 2007/069037 A1 | 6/2007 |

OTHER PUBLICATIONS

U.S. Appl. No. 13/166,903, filed Jun. 23, 2011, Suau, et al.
French Preliminary Search Report issued Feb. 9, 2011, in Patent Application No. FR 1056658 (with English Translation of Category of Cited Documents).
English Translation of First Office Action issued Dec. 9, 2014 in Japanese Patent Application No. 2013-524489 filed Jul. 6, 2011.

* cited by examiner

*Primary Examiner* — Peter D Mulcahy
(74) *Attorney, Agent, or Firm* — Oblon, McClelland, Maier & Neustadt, L.L.P

(57) ABSTRACT

Non water-soluble polymers with a comb structure and a (meth)acrylic skeleton on which are grafted side chains containing at least one hydrophobic monomer of the styrene or (meth)acrylic ester type on C1 to C4, and at least one hydroxy or methoxy polylakylene glycol monomer. The levels of monomers are such that the polymer is amphiphilic because it is both rich in hydrophobic monomer and polylakylene glycol monomer. These products, used in paper coating dispersions, enable an increase in their Brookfield™ viscosity, a reduction in their ACAV viscosity, and an improvement in their water retention, which makes them particularly well suited for dry extract and/or high deposit speed coatings.

11 Claims, No Drawings

AMPHIPHILIC AND NON-WATER SOLUBLE (METH)ACRYLIC COMB POLYMERS

REFERENCE TO PRIOR APPLICATIONS

This application claims priority to U.S. provisional application Ser. No. 61/376,350, filed Aug. 24, 2010; and to French patent application 10 56658, filed Aug. 19, 2010, both incorporated herein by reference.

FIELD OF THE INVENTION

The present invention concerns the field of paper and focuses more particularly on certain additives known by the expressions "rheology modifiers" and "water retention agents". These are used in the formulation of coating dispersions which are aqueous formulations designed to be applied to the surface of the sheet of paper. The invention relates more specifically to certain polymeric additives that have the property of increasing the viscosity of dispersions under low shear gradients and of decreasing it at high gradients while improving the water retention of such dispersions. This compromise corresponds to obtaining a dispersion:

that is manipulable (increase of viscosity at low gradient),
that is usable in a high speed or elevated dry extract dispersion (decrease of viscosity at high gradient to offset the increase in blade pressure),
whose water and water-soluble substances migrate little on the sheet of paper (thus limiting the evolution of the rheology of the dispersion that is not used and is recycled in the coating process).

These additives are non water-soluble comb structure polymers with a (meth)acrylic skeleton on which are grafted side chains containing at least one hydrophobic monomer of the styrene or (meth)acrylic ester type on C1 to C4, and at least one hydroxy or methoxy polylakylene glycol monomer. The levels of monomers are such that the polymer is amphiphilic because it is both rich in hydrophobic monomer and polylakylene glycol monomer.

Additional advantages and other features of the present invention will be set forth in part in the description that follows and in part will become apparent to those having ordinary skill in the art upon examination of the following or may be learned from the practice of the present invention. The advantages of the present invention may be realized and obtained as particularly pointed out in the appended claims. As will be realized, the present invention is capable of other and different embodiments, and its several details are capable of modifications in various obvious respects, all without departing from the present invention. In this regard, the description herein is to be understood as illustrative in nature, and not as restrictive.

BACKGROUND OF THE INVENTION

In the manufacture of the paper sheet by coating, there is deposited on the surface of the base paper an aqueous composition called a "coating dispersion" the function of which is to confer on the sheet a certain number of properties such as opacity, gloss, whiteness or again, printability by gravure or offset printing processes.

These formulations are composed of water, one or more mineral fillers, one or more water-soluble or non water-soluble binders, as well as various additives such as dispersants, water retention agents, optical brighteners, rheology modifiers, etc.

With respect to the rheology of the dispersion, it is first and foremost important to have an easily pumpable and filterable product in the feed circuits of the coating process, with no tendency for the formation of foam or coating splash as well as a too rapid sedimentation. This requirement corresponds to an increase in the viscosity under low shear gradient, or a Brookfield™ viscosity measured at 100 RPM and at 25° C. with the device of the same name, without which the dispersion is too liquid.

Another important rheological characteristic is the viscosity under high shear gradient, as expressed by an ACAV viscosity at 25° C., measured in a capillary viscometer where the dispersion can be subjected to high shear gradients (from $10^5$ to $3 \times 10^6$ $s^{-1}$) of the same order of magnitude as those observed during the coating process in the application of the coating blade scraping off the excess dispersion deposited. The viscosity under high shear gradient is a determinant of the blade pressure to be exercised. The higher it is, the higher the blade pressure must be to control the weight of the layer deposited.

Now the increase in the dry extract of dispersions and coating speeds correspond to a trend observed in recent years, because they create economic and/or quality advantages. However, the increase in dry extract leads to an increase in the viscosity under shear and as a consequence, to an increase the blade pressures required. The higher coating rates cause an increase in the hydraulic force on the blade and thus in the pressure to be exerted, which can lead to overflows of the dispersion ("foams" or "beads"). This problem is reported in document WO 84/04491.

This double requirement is added to the need to reduce the phenomenon of migration of the water and water-soluble species through the paper. An attempt is made to reduce as much as possible this migration in order to prevent an evolution of the rheology of the unused coating dispersion that is recycled in the coating process. This is referred to as the phenomenon of "water retention" which one seeks to improve, i.e. to increase.

With respect to rheology modifiers and water retention agents, there has been developed in recent years a particular class of comb polymers featuring a (meth)acrylic skeleton with side chains of the hydroxy or methoxy polyalkylene glycol type, possibly containing a hydrophobic monomer such as ethyl or butyl acrylate. These are aqueous solutions of water-soluble polymers, as developed particularly by the COATEX™ company through its Rheocarb™ product line in the paper field.

Many usage patents today describe the application properties of these structures in a coating dispersion: WO 01/96007 A1, WO 04/044022 A1, WO 04/041883 A1, WO 07/069037 A1 and WO 08/149226 A1. These polymers can be introduced into the coating dispersion through the suspension of mineral substances in which they improve the rheology (WO 01/96007 A1). In addition to their ability to increase the Brookfield™ viscosity of the dispersion, they help to improve the optical azuration (WO 04/044022 A1) and brightness (WO 04/041883 A1) thereof. They are also known to increase the water retention of the dispersion (WO 07/069037 A1), but also their viscosity under high shear gradient (WO 08/149226 A1).

In these documents:
the hydrophobic monomer of the ethyl acrylate or styrene type is always optional (as particularly indicated in WO 01/96007 A1, WO 04/044022 A1, WO 04/041883 A1 and WO 07/069037 A1);
When present, its concentration by weight is always less than 20% of the total weight of the monomers involved (5% by weight of ethyl acrylate in test No. 13 of document WO 04/044022 and 4.5% to 19.5% by weight of ethyl acrylate in tests No. 4 to 7 of document WO 01/96007 A1); no reference is made to the possible role played by such a monomer. In addition, nothing can draw attention to it, the 5 products mentioned above appearing anecdotally among the 225 trials assembled in the documents;

the polymer which is the object of the corresponding inventions is always described as water-soluble;

the examples of document WO 08/149226 A1 make reference to an increase in the ACAV viscosity of coating dispersions, which makes the corresponding polymers a priori unsuitable for a dry extract and/or a high rate of deposit coating.

However, with a view to developing a polymer capable of increasing the Brookfield™ viscosity of a dispersion, of decreasing its ACAV viscosity while increasing its water retention, the inventor successfully identified a particular class of (meth)acrylic comb polymers wherein they are non water-soluble polymers that are both rich in hydrophobic monomers of the styrene or acrylic ester type in C1 to C4 and rich in hydroxy or methoxy polyalkylene glycol monomer.

DETAILED DESCRIPTION OF THE PREFERRED EMBODIMENTS

By indicating that the polymers which are the objects of the present invention are not water-soluble, what is meant is that the polymers in the state, that is to say, in the acid form, are not soluble in water (unlike the polymers exemplified in the documents cited above, which are water soluble in the acid form). However, once transformed into a salt, the polymers of the present invention can become soluble in water.

In a manner that was unexpected because it was not suggested by the above documents, and contrary to the teaching of document WO 08/149226 A1 on ACAV viscosity, the particular selection by the inventor allows an improvement in the 3 aforementioned properties. This improvement is even a compromise never achieved with polymers or other additives of the prior art: not only is the Brookfield™ viscosity increased, but the ACAV viscosity of dispersions is reduced, and this is achieved with the same dispersion containing no additive: such a result had never before been achieved.

In this sense, the polymers that are the objects of the present invention behave advantageously as low shear gradient thickening agents and shear-thinning agents under high shear gradient. Moreover, they prove to be very effective water retention agents. These results make them the ideal candidates for dry extract and/or high deposit speed coating processes. Only the yet unpublished Patent Application (filing No.): FR 10 52605) had achieved such a result at the level of the rheological properties of dispersions, but for the larger doses and without the maintenance of water retention.

More precisely, the products that are the objects of the present invention are in the form of aqueous dispersions of non-water soluble polymer particles. The polymer is itself wherein it is constituted, in % by weight of the total weight of the monomers involved:

a) of 30% to 60% of a first hydroxy and/or methoxy polyalkylene glycol monomer, b) of 20% to 60% of a second hydrophobic monomer chosen from styrene and the (meth)acrylic esters with 1 to 4 carbon atoms, c) of 0.1% to 20% of a third carboxylic monomer chosen from among acrylic and methacrylic acids, d) of from 0 to 10% of a fourth possible monomer called "associative", e) of 0 to 5% of a fifth potential monomer called "cross-linking", the sum of the percentages by weight of monomers a) to e) being equal to 100%.

The % of the hydrophobic monomer b) greater than 20% ensures the novelty of the polymers according to the present invention with respect to those described in the previously cited prior art. It contributes also to the non-water soluble nature of the products that are the object of the invention. The % of hydroxy and/or methoxy polyalkylene glycol greater than 30% ensures in particular the novelty with respect to already existing latexes and stabilized on the basis of such reasons (see particularly documents EP 1 981 920 A1 and WO 94 24 202 A1). It is the choice of all of the above-mentioned percentages that leads to new and inventive structures enabling the resolution of the complex technical problem already mentioned in the field of coating dispersions.

Also, a first object of the present invention resides in a non-water soluble polymer comprising, consisting essentially of, or consisting of expressed in % by weight of each monomer:

a) from 30% to 60% at least of a hydroxy and/or methoxy polyalkylene glycol monomer with the formula $R-(EO)_m-(PO)_n-R'$, with m and n designating integers that are less than or equal to 150, with at least one of them being a non-zero, EO and PO respectively designating ethylene oxide and propylene oxide, R designating the methacrylate or methacrylurethane function.

R' designating a hydroxy or methoxy, group, b) from 20% to 60% of at least one hydrophobic monomer chosen from styrene and the (meth)acrylic esters with 1 to 4 carbon atoms, c) from 0.1% to 10% of at least one monomer which is acrylic and/or methacrylic acid, d) from 0 to 5% of an associative monomer with the formula $R-(EO)_m-(PO)_n-R'$, with m and n designating integers that are less than or equal to 150, with at least one of them being a non-zero, EO and PO respectively designating ethylene oxide and propylene oxide, R designating the methacrylate or methacrylurethane function, R' designating an alkyl or aryl or alkylaryl group with 8 to 32 carbon atoms, linear or branched, e) from 0 to 5% of a monomer with two ethylenic unsaturations.

the sum of the percentages a), b), c), d) and e) being equal to 100%.

This structure, even though new, may be obtained by conventional polymerization processes, using known catalytic systems as described in document EP 1 981 920 A1 above, but also in document EP 0 819 704 A1.

This polymer is preferred wherein it presents a mean molar mass by weight of between 1,000,000 and 6,000,000 g/mol, as determined by GPC. Reference can be made to the measurement technique described in document WO 07/069037 A1.

The polymer may be obtained by known methods of conventional free radical copolymerization in solution, in direct or inverse emulsion, in suspension or precipitation in suitable solvents, in the presence of known catalytic systems and transfer agents, or by processes of controlled radical polymerization such as the method known as Reversible Addition Fragmentation Transfer (RAFT), the method known as Atom Transfer Radical Polymerization (ATRP), the method called Nitroxide Mediated Polymerization (NMP), or even the method referred to as Cobaloxime Mediated Free Radical Polymerization.

It is obtained in the acid and possibly distilled form. It can also be partially or totally neutralized by one or more neutralization agents preferentially selected from the hydroxides of sodium and potassium and their mixtures.

A second object of the present invention is an aqueous dispersion containing from 0.1% to 50% by weight of the above-mentioned polymer in relation to their total weight.

This polymer can then be used in a paper coating dispersion in which it increases the Brookfield™ viscosity, reduces the ACAV viscosity and improves the water retention.

More precisely, this dispersion comprises, consists essentially of, or consists of:
1) from 3 parts to 20 parts, preferentially from 5 parts to 15 parts by dry weight of binder per 100 parts by dry weight of mineral substances.
2) from 0.1 parts to 2 parts, preferentially from 0.1 parts to 1.5 parts by dry weight of the above-noted polymer per 100 parts by dry weight of mineral substances.
3) water in a quantity by weight of between 20% and 80%, in relation to the total weight of the coating dispersion.

Additives may be present, such as those used in the usual composition of a coating dispersion, such as biocides, antifoam agents, optical brighteners and optical brightener media, without however this list being exhaustive.

The dispersion may also contain a mineral substance selected from natural or synthetic calcium carbonate, kaolin, talc and mixtures of these substances.

Its binder may be selected from among the water-soluble binders, and notably starch, or from among the synthetic latex polymer binders such as styrene-acrylic and styrene-butadiene or their mixtures, or mixtures of these binders.

Finally, in a particular variant corresponding to a so-called "high dry extract" dispersion, it preferably contains 20% to 35% by weight of water.

While not bound by theory, it is believed that the function of the above-noted polymer, when it is used in a paper coating dispersion with the properties indicated above, is that of an agent that is both a water retainer while it increases the Brookfield™ viscosity and reduces the ACAV viscosity.

The above written description of the invention provides a manner and process of making and using it such that any person skilled in this art is enabled to make and use the same, this enablement being provided in particular for the subject matter of the appended claims, which make up a part of the original description.

As used herein, the words "a" and "an" and the like carry the meaning of "one or more."

The phrases "selected from the group consisting of," "chosen from," and the like include mixtures of the specified materials. Terms such as "contain(s)" and the like are open terms meaning 'including at least' unless otherwise specifically noted.

All references, patents, applications, tests, standards, documents, publications, brochures, texts, articles, etc. mentioned herein are incorporated herein by reference. Where a numerical limit or range is stated, the endpoints are included. Also, all values and subranges within a numerical limit or range are specifically included as if explicitly written out.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. In this regard, certain embodiments within the invention may not show every benefit of the invention, considered broadly.

The invention claimed is:

1. An aqueous dispersion, comprising:
water; and
a polymer, which comprises
a) from 30% to 60% of a hydroxy and/or methoxy polyalkylene glycol monomer of formula:

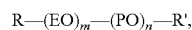

wherein
m and n are each independently integers less than or equal to 150, with the proviso that at least one of m and n is non-zero,
EO and PO respectively are ethylene oxide and propylene oxide,
R is a methacrylate or methacrylurethane function,
R' is hydrogen or methyl,
b) from 20% to 60% of a hydrophobic monomer selected from the group consisting of styrene and (meth)acrylic esters having 1 to 4 carbon atoms in the ester group,
c) from 0.1% to 10% of acrylic and/or methacrylic acid,
d) from 0 to 5% of a monomer of formula:

wherein
m and n are each independently integers less than or equal to 150, with the proviso that at least one of m and n is non-zero,
EO and PO respectively are ethylene oxide and propylene oxide,
R is a methacrylate or methacrylurethane function,
R' is an alkyl or aryl or alkylaryl group with 8 to 32 carbon atoms, linear or branched,
e) from 0 to 5% of a monomer with two ethylenic unsaturations,
wherein
the sum of the percentages a), b), c), d) and e) is 100%, and
the polymer is not water soluble in the acid form.

2. The aqueous dispersion according to claim 1, wherein a mean molar mass of the polymer is between 1,000,000 and 6,000,000 g/mol, as determined by GPC.

3. The aqueous dispersion according to claim 1, wherein the polymer is obtained by a method selected from the group consisting of free radical copolymerization in solution, in direct or inverse emulsion, in suspension or precipitation, and controlled radical polymerization.

4. The aqueous dispersion according to claim 1, wherein the polymer is obtained by a method selected from the group consisting of Reversible Addition Fragmentation Transfer (RAFT), Atom Transfer Radical Polymerization (ATRP), Nitroxide Mediated Polymerization (NMP), and Cobaloxime Mediated Free Radical Polymerization.

5. The aqueous dispersion according to claim 3, wherein the polymer is obtained in the acid form.

6. The aqueous dispersion according to claim 1, wherein the polymer is partially or totally neutralized by at least one neutralization agent.

7. The aqueous dispersion according to claim 6, wherein the at least one neutralization agent is at least one hydroxide selected from the group consisting of sodium hydroxide and potassium hydroxide.

8. The aqueous dispersion according to claim 1, further comprising: a binder and a mineral substance,
wherein
the content of the binder is from 3 parts to 20 parts by dry weight per 100 parts by dry weight of the mineral substance:
the content of the polymer is from 0.1 parts to 2 parts by dry weight per 100 parts by dry weight of the mineral substance, and
the quantity of the water is between 20% and 80%, by weight relative to the total weight of the dispersion.

9. The aqueous dispersion according to claim 8, wherein the mineral substance is at least one selected from the group consisting of natural calcium carbonate, synthetic calcium carbonate, kaolin and talc.

10. The aqueous dispersion according to claim 8, wherein the binder is at least one selected from the group consisting of starch, styrene-acrylic acid copolymers and styrene-butadiene copolymers.

11. The aqueous dispersion according to claim 8, wherein the quantity of water is 20% to 35% by weight of the dispersion.

* * * * *